United States Patent [19]
Cote et al.

[11] 3,967,302
[45] June 29, 1976

[54] ACCESSORY ATTACHMENT FOR PHOTOGRAPHIC APPARATUS

[75] Inventors: Gerald J. Cote, Plymouth; John A. Lewis, Jr., Stoneham; James K. Skurski, Beverly, all of Mass.

[73] Assignee: Polaroid Corporation, Cambridge, Mass.

[22] Filed: Dec. 16, 1974

[21] Appl. No.: 533,326

[52] U.S. Cl. .............................. 354/295; 354/126
[51] Int. Cl.² ........................................ G03B 17/56
[58] Field of Search .............. 354/295, 80, 81, 82, 354/126, 187, 189, 286, 287, 293, 354; 224/5 V

[56] References Cited
UNITED STATES PATENTS

| | | | |
|---|---|---|---|
| 1,053,400 | 2/1913 | Johnson | 354/81 |
| 3,747,490 | 7/1973 | Brandt | 354/286 |
| 3,759,153 | 9/1973 | Aimo et al. | 354/295 X |
| 3,820,135 | 6/1974 | Dickson | 354/81 |
| 3,821,771 | 6/1974 | Johnson et al. | 354/293 |

FOREIGN PATENTS OR APPLICATIONS

| | | | |
|---|---|---|---|
| 732,833 | 6/1955 | United Kingdom | 354/287 |

*Primary Examiner*—L. T. Hix
*Assistant Examiner*—E. M. O'Connor
*Attorney, Agent, or Firm*—John W. Ericson

[57] ABSTRACT

An accessory attachment for use with a camera of the type having a frontal housing for an objective lens, a shutter mechanism, camera function-controlling devices such as photocells and shutter or controls knobs or buttons, and provided with a socket for mounting a flash lamp. The attachment serves to mount accessories such as auxiliary portrait, wide-angle, or telephoto lenses, filter lenses for the camera's objective lens and photocell, auxiliary shutter or control knobs, and flash equipment in operative relation to the corresponding elements of the camera. The attachment comprises a housing mounting the accessories, receivable against wall-forming means of the camera, and having a movable latch member engageable with a strap or recess provided on the camera. A plug secured to the accessory attachment is slidably receivable in the flash lamp socket of the camera to cooperate with the latch member in locating and securing the attachment.

4 Claims, 6 Drawing Figures

ACCESSORY ATTACHMENT FOR PHOTOGRAPHIC APPARATUS

BACKGROUND AND BRIEF DESCRIPTION OF THE INVENTION

This invention relates to means for conveniently attaching accessories to cameras, and has special application to cameras of the kind having a frontal housing for mounting such elements as an objective lens, a shutter mechanism, a photographic process-controlling photocell, flash equipment, or related devices.

Cameras of a type in connection with which this invention will be particularly described are disclosed and claimed, inter alia, by U.S. Pat. Nos. 3,714,879 and 3,810,211, which are assigned to the assignee of this application. These patents pertain to compact collapsible cameras of the self-developing type, now well known in the art and in common use. Such a camera includes a lens-shutter housing of generally parallelepiped form, having a front wall in which an objective lens and camera function-controlling devices are mounted, and side, top, and bottom walls which extend rearwardly to terminate in rear corners, between which a light-tight enclosure, housing film for sequential exposure by the shutter mechanism, adjoins the rear portion of the lens-shutter housing. The enclosure is formed by a series of housing members, which are pivotally connected with the lens-shutter housing in a collapsible four-bar linkage, so that the camera may be folded into a flat, compact form.

It is often desired to employ various camera accessories for special photographic purposes. These accessories include flash and strobe-light equipment; special lenses for close-ups, telephoto, or wide-angle photography; filters for haze or for special effects; and remote-control and time-delay equipment. It is of great convenience to the photographer to be able to attach and detach such auxiliaries quickly, and with a minimum of manipulation. Further, the accessories should be as compact as possible, so as not to overburden the photographer. These requirements acquire even more pronounced importance in relation to cameras which are intended to be specially compact so that they can be carried in pocket or purse, rather than in bulky and cumbersome shoulder cases.

But the very compactness of such cameras poses obstacles to the convenience of attaching accessories, and of making necessary electrical and mechanical connections. The necessarily small lens-shutter housing is already rather crowded by the elements which must be mounted on it, and which must have open access; these include the objective lens, a photocell and manual knobs for controlling the camera settings, an actuator or shutter button, and sockets for flash or strobe lights for remote-control or time-delay cables. The difficulty is therefore to mount and connect any desired accessories without obscuring or blocking any of the elements of the camera proper.

The general object of the present invention is to afford photographers convenient, easily and quickly mountable and demountable means for attaching accessories in operative relation to cameras. Further objects and advantages of the invention will become apparent as the following description proceeds.

DESCRIPTION OF THE DRAWINGS

While the specification concludes with claims particularly pointing out the subject matter which is regarded as the invention, it is believed that a clearer understanding may be gained from the following description of a preferred embodiment, referring to the accompanying drawings, in which:

DESCRIPTION OF THE PREFERRED EMBODIMENT

Figure 1:
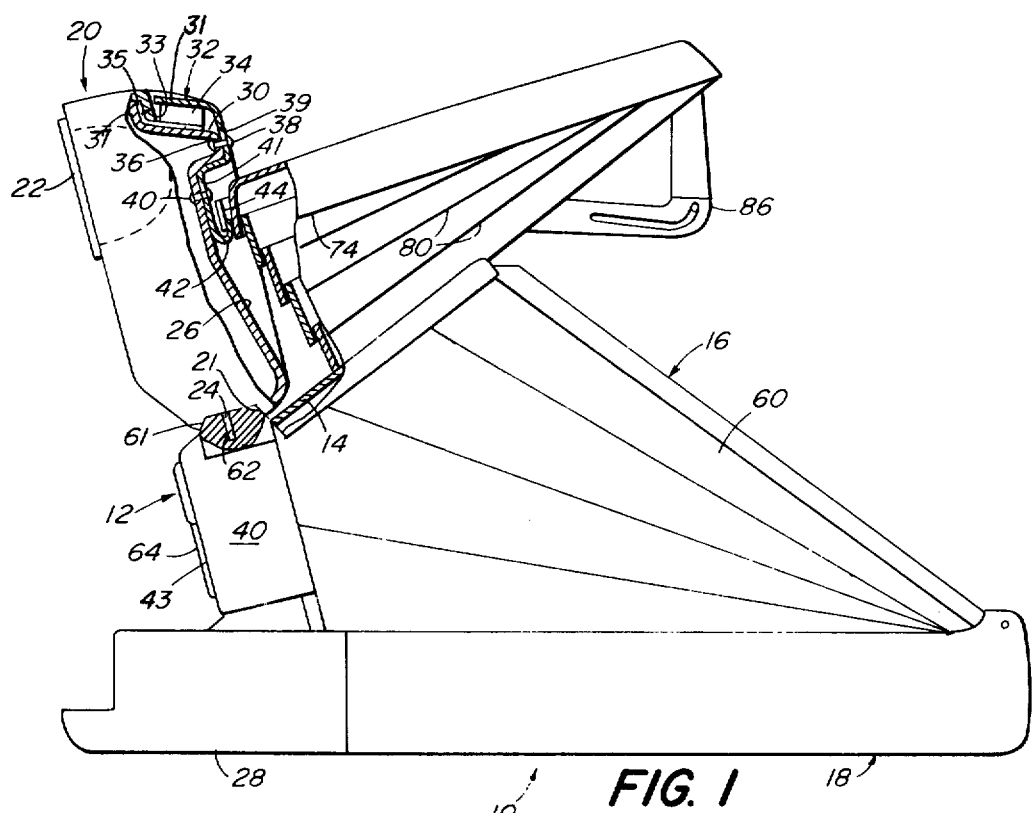
FIG. 1 is a view in side elevation and partially in section of the improved accessory attachment mounted on an illustrative camera of a type with which the invention may be employed.
Figure 2:
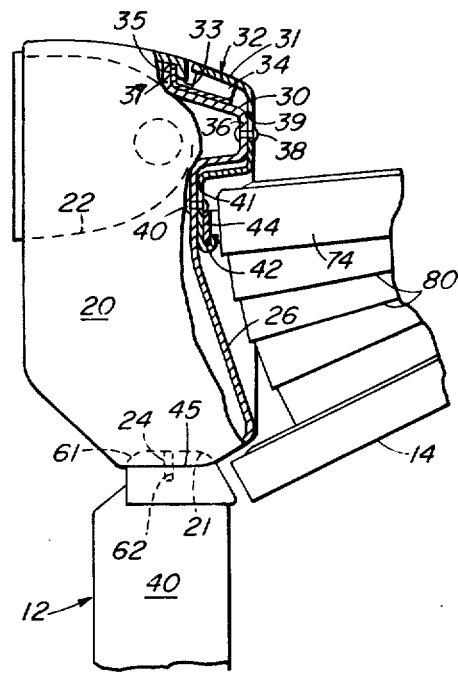
FIG. 2 is a fragmentary partially-sectional view in side elevation of the attachment, on an enlarged scale.
Figure 3:
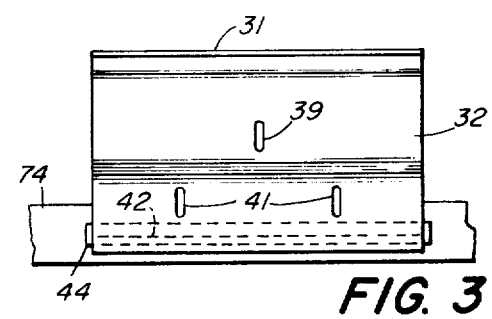
FIG. 3 is a fragmentary view in front elevation showing the mode of cooperation of a movable latch member of the attachment with a strap attached to the camera.
Figure 4:
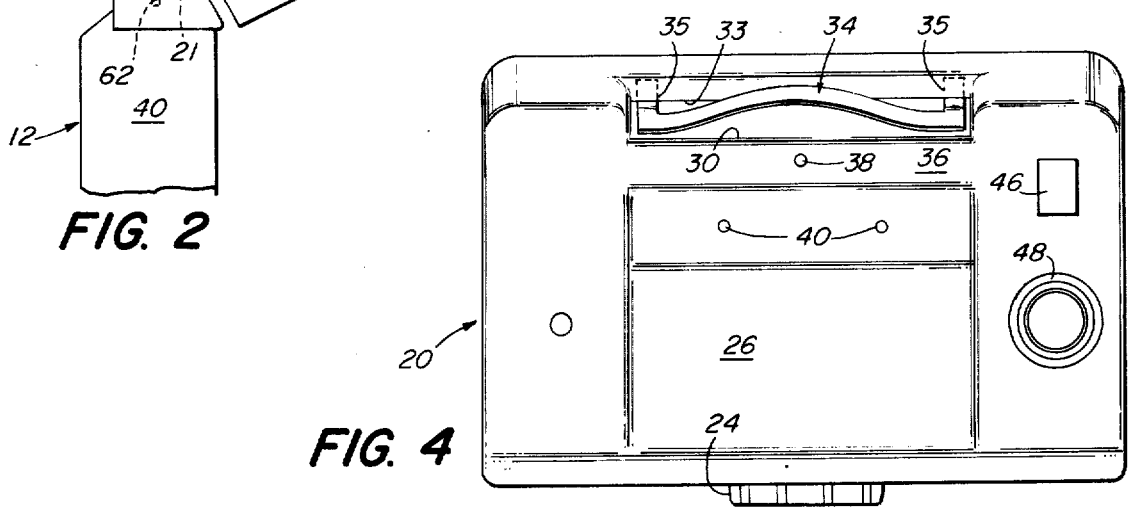
FIG. 4 is a view in rear elevation of the attachment, with the latch member of FIG. 3 removed.
Figure 5:
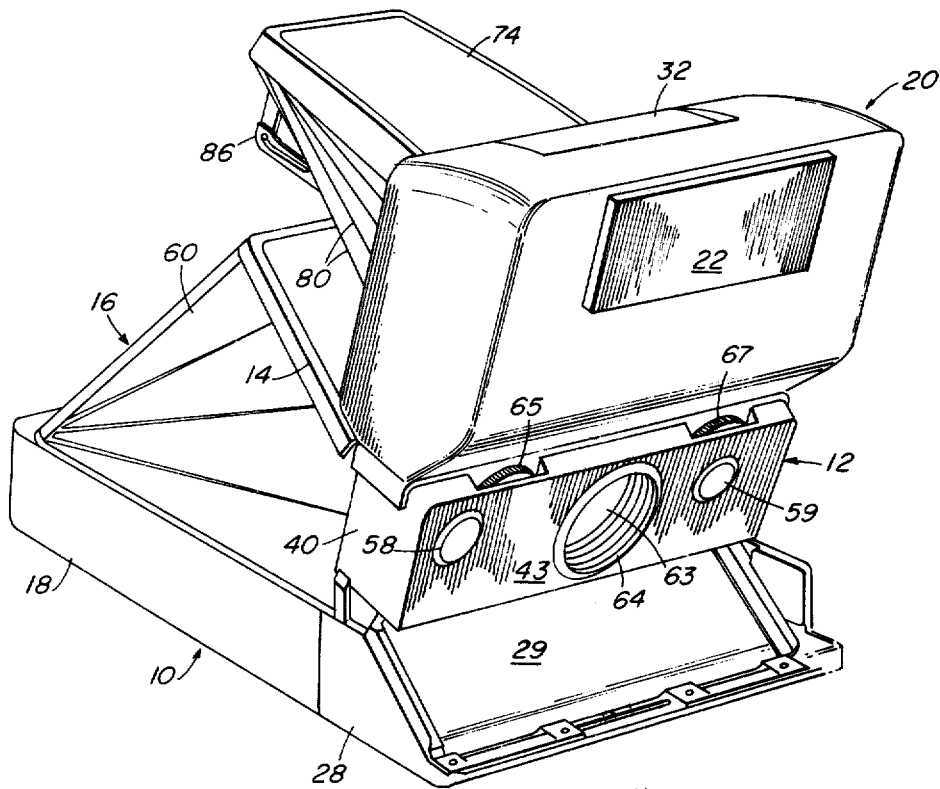
FIG. 5 is a pictorial view of the accessory attachment mounted on the camera of FIG. 1.

Referring to FIGS. 1 and 2, a camera is generally indicated at 10, which is of a general type suitable for use with the improved accessory attachment. The illustrated camera is collapsible, as described more fully in the aforementioned U.S. Pat. Nos. 3,714,789 and 3,810,211, but is shown in its extended operative condition. It includes a series of housing members 14, 16, 18 and a lens-shutter housing 12, which are pivotally connected to form a collapsible four-bar linkage so that the camera may be folded into a flat, compact form. An additional housing member 28 is hinged to housing member 18, and normally latched in the position shown. When unlatched, the housing member 28 can be swung down to open an entry slot for insertion of a film magazine (not shown) into the camera; this slot is normally closed by a pivoted, resiliently biased light-shielding plate member 29 carried on the housing member 28. A light-tight enclosure for receiving the film magazine is defined by the aforementioned housing members and by a collapsible bellows 60. The housing member 14 supports a collapsible viewing device 74 which includes telescoping blades 80, and a linkage 86 to erect a mirror and lens system (not shown) when the camera is opened, to allow reflex viewing through an objective lens 63 of any scene to be photographed.

The lens-shutter housing 12 is generally parallelepiped in form, having a front wall 43, rearwardly-extending side walls 40, and a top wall 45. The top wall 45 is provided with a flash unit support pedestal 61, in which a socket 62 is formed to receive a connecting plug of a flash unit (not shown) of a type more fully described by U.S. Pat. No. 3,759,153, assigned to the assignee of this application.

The housing 12 encloses a suitable shutter mechanism (not shown). The objective lens 63 is centrally mounted in the front wall 43, and surrounded by a bezel 64. To its left is located a transparent lens 59 for admitting incident light from any scene viewed by the objective lens to a photocell (not shown) for controlling the photographic functions of the camera in a known manner. A camera cycle start button 58, commonly referred to as a shutter button, is set to the right of the objective lens. The upper edge of the front wall is formed with recesses to accommodate a manual lens-focusing knob 65, and a manual light/dark control knob 67 which adjusts the relationship between the camera settings and the controlling photocell responses in a known fashion.

It will be apparent that the crowded condition of a compact lens-shutter housing resulting from the necessary presence of all these elements, combined with the requirement not to obscure or render any of them inaccessible, poses a material obstacle to convenient attachment of camera accessories such as auxiliary lenses, flash equipment, and the like.

According to the present invention, an accessory attachment comprises a housing 20 mounting a camera accessory, which is illustrated as an electronic flash unit 22. The housing encloses the battery, electronic circuit, discharge tube and reflector of the flash unit. It is the function of the attachment to mount this accessory in operative relation to the camera, and to make such electrical connections as may be required to operate the accessory in appropriately-timed relation to the camera. The attachment bears a protruding connecting plug 24 which is slidably receivable in the socket 62 of the pedestal 61, and which serves both to locate the attachment relative to the lens-shutter housing 12 in the plane of its top wall 45, and to form electrical connections with the camera's function-controlling means required to operate the accessory. Appropriate connecting means are well known in the art, as for example from the aforementioned U.S. Pat. No. 3,759,153, and no further description thereof is believed to be necessary for an understanding of the present invention.

The housing 20 has a recessed lower surface 21 which is receivable conformably against the top wall 45 and pedestal 61 of the lens-shutter housing 12, when the plug 24 is fully inserted into the socket 62. To cooperate with the plug in securing the attachment, a latch member 32 is slidably mounted at the rear of the housing 20, having a hook portion 42 for releasably engaging a recess provided by a strap 44 secured to the front of the viewing device 74. The latch member is curved to conform to an upper recess 30 and a lower recess 26 in the rear surface of the housing 20, and has an accessible trigger portion 31 for finger operation. The latch member is slidably mounted on the housing by means of rivets 38, 40 passing, respectively, through vertically elongated slots 39, 41 in the latch member, and is biased toward the illustrated raised latching position by a curved spring 34. The spring is secured to the housing by means of legs 35 trapped in a recess between lips 33 and 37 formed in the housing.

To mount the accessory attachment on the camera, the plug 24 is first inserted into the socket 62, with the housing tilted slightly forwardly to permit the latch member 42 to pass the strap 44. Then the trigger portion 31 is depressed to move the hook portion 42 below the strap, the attachment is tilted slightly clockwise as viewed in FIG. 2 to pass the hook beneath the strap, and the trigger is released to permit the spring 34 to engage the hook with the strap as shown. A reversal of this procedure readily removes the attachment from the camera.

Figure 6:
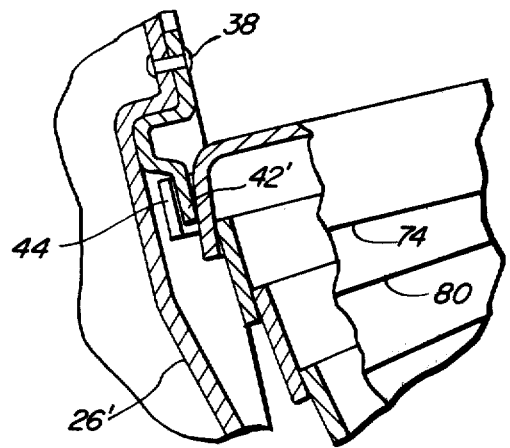
FIG. 6 is a fragmentary schematic elevational sketch, with parts shown in cross-section and parts broken away, of a modification of the latching mechanism of FIGS. 1 through 5.

FIG. 6 illustrates a simplified form of the latching mechanism for securing the attachment to the camera.

As shown, the latch member 42' is curved downwardly, so that attachment may be effected by partially folding the viewing device 74, then releasing it to allow the strap 44 to pass upward into latching engagement with the latch member 42'. This form of construction permits the latch member 42' to be fixed to the attachment, and thus obviates the trigger portion 31 and its associated structure and functions. Such simplification is achieved at the risk that the attachment may be thrown forward off the camera, breaking the plug 24, should the viewfinder be inadvertently folded during use. Thus, the construction described in connection with FIGS. 1 through 5 is presently preferred.

While the illustrated embodiments employ a strap 44 attached to the viewing device 74, it should be understood that the latch 32 may cooperate with any suitably-formed recess or strap provided in any portion of the camera.

The invention has been described in specific connection with a flash unit accessory. However, it will be apparent that other types of accessories may be mounted on a camera by the same attachment means. For example, a sun shade, filter, or auxiliary lens may be mounted by the attachment in aligned relation with, and in front of, the camera's objective lens 63, by extending the housing 20 downwardly and forwardly to overly the front wall 43 of the lens-shutter housing 12.

What is claimed is:

1. An accessory attachment for use with a camera having a front wall mounting a lens, and wall-forming means extending rearwardly from said front wall, said camera being formed with a socket and provided with recess-forming means, said accessory attachment comprising:
    a camera accessory device and a housing mounting said accessory device therein, said housing including an accessory-mounting front portion and being formed with a lower surface receivable on said wall-forming means of said camera, said housing further comprising means forming a rear wall generally perpendicular to said surface, latch means in substantially movably mounted on said rear wall in substantially spaced relation to said surface and releasably engageable with said recess-forming means, and plug means attached to and extending from said housing, said plug means being receivable in said socket to cooperate with said latch means in securing said accessory device on said camera.

2. An accessory attachment for use with a camera having a front wall mounting a lens, and wall-forming means extending rearwardly from said front wall, said camera being formed with a socket and provided with recess-forming means, said accessory attachment comprising:
    a camera accessory device and a housing mounting said accessory device therein, said housing including an accessory-mounting front portion and being formed with a surface receivable on said wall-forming means of said camera, latch means movably mounted on said housing and releasably engageable with said recess-forming means, said latch means being slidably mounted on said housing for movement between a first position for engaging said recess-forming means and a second position retracted from engagement therewith, spring means biasing said latch means toward said first position, and plug means attached to and extending from said housing, said plug means being receivable in said socket to cooperate with said latch means in securing said accessory device on said camera.

3. An accessory attachment for use with a camera including a lens-shutter housing formed with a front wall mounting a lens and a top wall extending rearwardly from said front wall and formed with a downwardly-extending socket, said camera including a collapsible viewfinder mounted thereon above said top wall for movement between collapsed and extended positions, said viewfinder being provided with recess-forming means, said accessory attachment comprising:

an electronic flash unit and a housing mounting said flash unit therein, said housing including an accessory-mounting front portion and being formed with a bottom surface receivable on said top wall of said camera, plug means attached to and extending downwardly from said bottom surface, said plug means being slidably receivable in said socket, and latch means movably mounted on said housing and including a reciprocable hook portion selectively engageable with said recess-forming means when said bottom surface is received on said top wall and said viewfinder is in its extended position.

4. In combination with a camera having a lens and shutter housing in which there is formed a socket and a collapsible viewfinder extendable to an erected positon for use, an electronic flash unit having a plug adapted to extend into said socket, and latch means comprising two cooperating parts mounted one on said viewfinder and one on said flash unit, said latch means being engageable in said erected position of said viewfinder to fix said flash unit to said camera and prevent the movement of said viewfinder to its collapsed position.

\* \* \* \* \*